United States Patent [19]

Loutfy et al.

[11] 4,252,774

[45] Feb. 24, 1981

[54] METHOD OF PROCESSING ALUMINOUS ORES

[75] Inventors: Raouf O. Loutfy, Naperville, Ill.; Rudolf Keller, Murrysville, Pa.; Neng-Ping Yao, Clarendon Hills, Ill.

[73] Assignee: The United States of America as represented by the United States Department of Energy, Washington, D.C.

[21] Appl. No.: 133,701

[22] Filed: Mar. 25, 1980

[51] Int. Cl.³ .................. C01G 23/02; C01F 7/62
[52] U.S. Cl. ........................... 423/76; 423/77; 423/79; 423/133; 423/136; 423/137; 423/149; 423/343; 423/492; 423/495; 423/210; 423/240; 423/210.5; 423/561 R
[58] Field of Search ............. 423/76, 77, 79, 135, 423/136, 137, 149, 343, 495, 210 M, 240 S, 210.5, 133, 561 R

[56] References Cited

U.S. PATENT DOCUMENTS

| 1,645,143 | 10/1927 | Humphrey et al. | 423/135 |
|---|---|---|---|
| 1,837,199 | 12/1931 | Brode | 423/135 |
| 1,875,105 | 5/1932 | Miggleton et al. | 423/136 |
| 4,059,673 | 11/1977 | Holliday et al. | 423/136 |
| 4,070,448 | 1/1978 | Jacobs et al. | 423/495 |
| 4,083,923 | 4/1978 | Lippman et al. | 423/495 |

FOREIGN PATENT DOCUMENTS 572171  3/1959  Canada ................................. 423/135

*Primary Examiner*—Herbert T. Carter
*Attorney, Agent, or Firm*—James E. Denny; Richard G. Besha; Robert J. Fisher

[57] ABSTRACT

A method of producing aluminum chloride from aluminous materials containing compounds of iron, titanium and silicon comprising reacting the aluminous materials with carbon and a chlorine-containing gas at a temperature of about 900° K. to form a gaseous mixture containing chlorides of aluminum, iron, titanium and silicon and oxides of carbon; cooling the gaseous mixture to a temperature of about 400° K. or lower to condense the aluminum chlorides and iron chlorides while titanium chloride and silicon chloride remain in the gas phase to effect a separation thereof; heating the mixture of iron chlorides and aluminum chlorides to a temperature of about 800° K. to form gaseous aluminum chlorides and iron chlorides; passing the heated gases into intimate contact with aluminum sulfide to precipitate solid iron sulfide and to form additional gaseous aluminum chlorides; and separating the gaseous aluminum chloride from the solid iron sulfide.

23 Claims, 1 Drawing Figure

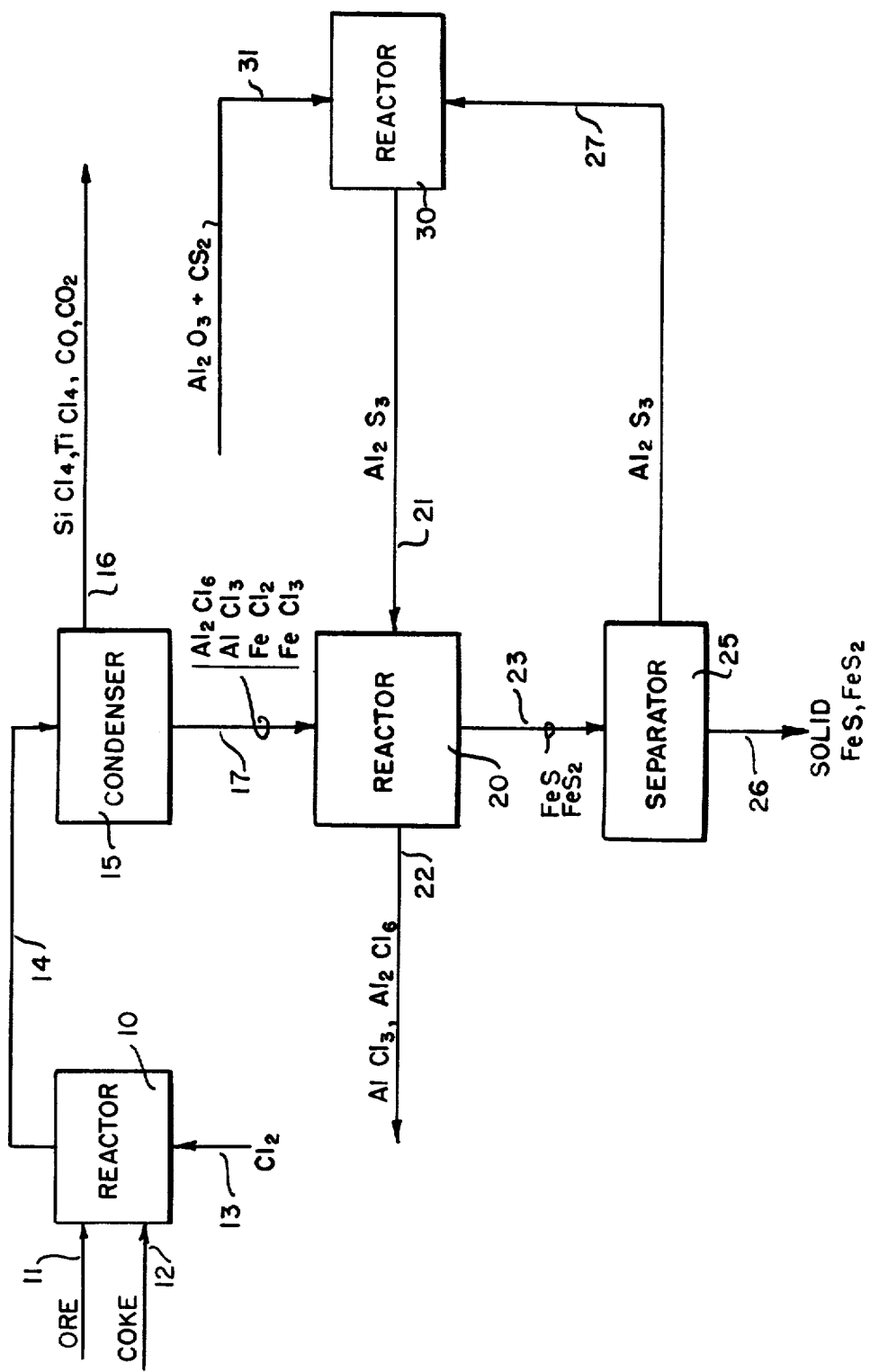

METHOD OF PROCESSING ALUMINOUS ORES

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a process for purifying aluminum chloride. It particularly concerns a process for producing relatively pure aluminum chloride from ores containing significant quantities of iron as well as lesser quantities of titanium and silicon.

Bauxite presently is the principal ore from which aluminum is produced; however, bauxite is not indigenous to the United States and the countries from which the United States imports bauxite have formed a cartel for controlling and regulating the sale of bauxite. It is advantageous therefore to develop alternative methods for producing aluminum from indigenous ores not presently utilized in the United States. Particularly, clays are rich in aluminum but also contain elements such as iron, titanium and silicon, all of which are present in bauxite but exist in greater concentrations in these clay ores and must be separated in an economical and efficacious manner in order to make the recovery of aluminum from clay economically feasible.

Theoretically, chlorination of the aluminous containing material should produce various chlorides of aluminum and iron along with silicon tetrachloride and titanium tetrachloride. The various boiling points of these materials are such that selective condensation should be available to separate relatively pure aluminum chloride. Chlorination of the aluminous containing ore in the presence of carbon produces, as heretofore stated, the chlorides of aluminum, iron, silicon, and titanium and also carbon dioxide and carbon monoxide. By cooling the gaseous mixture to about 800° K., ferrous chloride condenses and may be selectively removed. At about 600° K. ferric chloride condenses and at about 400° K. aluminum chloride condenses leaving the oxides of carbon as well as titanium tetrachloride and silicon tetrachloride. This scheme is uneconomical and not viable for two reasons. First, chlorine is an expensive reagent and an economically feasible process for recovering or winning aluminum from ores thereof requires the chlorine to be recovered for reuse in the process. The foregoing condensation reactions all result in significant losses of chlorine as iron salts as both the ferrous and ferric state condense. Secondly, iron aluminum hexachloride is formed as a complex and has about the same volatility as aluminum trichloride, whereby ferric chloride is extremely difficult to separate as a contaminate from aluminum chloride. Particularly, the ferric iron cannot be separated by selective condensation sufficiently to permit the resulting aluminum chloride to be useful as a feed material for the further processing thereof to aluminum.

For these reasons, selective condensation of the off gases from the carbo-chlorination of aluminum ores is not generally considered to be an acceptable method for the winning of aluminum metal from aluminum containing materials such as bauxite. In fact, the Bayer-Hall process is at present the only commercially used process in the United States to produce aluminum from bauxite.

The silicon and titanium, usually present in clay ores, can efficiently and economically be separated from aluminum chloride in the carbo-chlorination of aluminum ores.

The following patents relate to but do not disclose or teach the claimed subject matter of the present invention.

U.S. Pat. No. 4,083,928 issued Apr. 11, 1978 to King discloses a process for the production of aluminum chloride from coked alumina and chlorine utilizing a fluidized bed in a reaction vessel having a nitride based refractory lining.

U.S. Pat. No. 4,035,169 issued July 12, 1977 to Sebenik et al discloses a method of separating aluminum chloride from gases produced during the chlorination of bauxite, clay and other aluminous ores wherein the aluminum chloride is dissolved in a molten salt solvent to separate silicon and titanium chlorides which are insoluble and thereafter vaporizing the aluminum chloride to produce a purified liquid product.

U.S. Pat. No. 4,082,833 issued Apr. 4, 1978 to Wyndham et al discloses the use of sulfur as a reaction promoter or reaction conditioner to enhance the carbo-chlorination of aluminous containing materials.

U.S. Pat. No. 3,861,904 issued Jan. 21, 1975 to Othmer teaches the halogenation of aluminum with a sulfur halide followed by disproportionation of the monohalide by cooling to give aluminum metal and aluminum trihalide. Any aluminum sulfide produced in the process disclosed by Othmer is reacted with metallic iron to give aluminum and an iron sulfate which is later reduced to iron for recycling.

SUMMARY OF THE INVENTION

It is an object of the present invention to provide a method for separating aluminum and iron chlorides while conserving the expensive chloride reagent.

It is a further object of the present invention to provide a process for producing aluminum from ores other than imported bauxite.

Another object of the present invention is to provide a method for producing aluminum chloride from aluminous materials containing iron comprising reacting the aluminous materials containing iron with carbon and a chloride containing gas at a temperature sufficient to form a gaseous mixture including chlorides of aluminum and iron and oxides of carbon, contacting the chlorides of aluminum and iron with aluminum sulfide at a temperature sufficient to precipitate an iron sulfide and to form gaseous aluminum chloride, and separating aluminum chloride gas from the precipitated iron sulfide.

Another object of the present invention is to provide a method of producing an aluminum chloride from aluminous material containing minor amounts of compounds of iron, titanium and silicon comprising reacting the aluminous materials with carbon and the chlorine-containing gas in the temperature range of from about 900° K. to about 1200° K. to form a gaseous mixture containing chlorides of aluminum, iron, titanium and silicon and oxides of carbon; cooling the gaseous mixture to a temperature in the range below the boiling point of the aluminum chloride in the mixture and above the boiling point of the titanium chloride in the mixture to condense the aluminum and iron chlorides while titanium tetrachloride and silicon tetrachloride remain in the gas phase to effect a separation thereof; heating the mixture of iron chlorides and aluminum chlorides to a temperature in excess of the boiling point of the iron chlorides in the mixture to form gaseous aluminum chlorides and iron chlorides; passing the heated gases into intimate contact with aluminum sulfide to precipitate an iron sulfide and to form gaseous aluminum chloride; and separating gaseous aluminum chloride from the precipitated iron sulfide.

A still further object of the present invention is to provide a method of separating gaseous mixtures of iron chlorides and aluminum chlorides comprising contacting the gaseous mixtures with aluminum sulfide at a temperature sufficient to precipitate iron sulfide and to form gaseous aluminum chlorides, and separating the gaseous aluminum chlorides from the precipitated iron sulfide.

These and other objects of the present invention may be more readily understood by reference to the following specification taken in conjunction with the drawing, in which:

DESCRIPTION OF THE DRAWING

The drawing is a schematic flow diagram of a process for producing purified aluminum chloride from the carbo-chlorination of aluminous containing materials.

DESCRIPTION OF THE PREFERRED EMBODIMENT

Referring to the drawing, ore 11 is introduced into the reactor 10 either in the pulverized form or in extruded or pellet form. For instance, the ore 11 containing alumina can be prepared by blending with particulate carbon and pressing into pellets or extrudates for convenient handling within the reactor 10. In any event, the ore 11 is introduced into the reactor 10 along with a suitable source of carbon 12 which may be in the form of coke and is there contacted with chlorine 13 at a temperature in the range of from about 900° K. to about 1200° K. Temperatures less than 900° K. seriously retard the reaction rate and temperatures in excess of 1200° K. are unnecessary and expensive.

The ore 11 may be selected from a wide variety of aluminous materials in addition to bauxite, for instance clay, anorthosite, oil or coal shale as well as purified alumina from the Bayer-Hall process. The chlorine 13 may be from a source of chlorine gas, carbon tetrachloride or other chlorine-containing materials such as, for instance, phosgene. The carbon 12 may be in the form of coke or the like as hereinbefore stated, or carbon monoxide, carbon tetrachloride or phosgene. It is intended to cover within the method of the present invention all well known sources of aluminous material 11, carbon 12 and chlorine 13. In the reactor 10, there is produced as off gases 14, aluminum hexachloride, aluminum trichloride, silicon tetrachloride, titanium tetrachloride, ferrous chloride, ferric chloride, the double ferric chloride molecule, as well as the oxides of carbon, these being carbon monoxide and carbon dioxide. As indicated, there are present in stream 14, significant quantities of iron chlorides, this is particularly so where clays are used as a feed material, these clays being indigenous materials to the United States in contrast to bauxite which is almost entirely imported. Clays often contain significant quantities of ilmenite (iron titanium oxide) and hematite, all of which appear in the off gas 14 from the reactor 10 in the form of a significant quantity of iron chlorides. It is these iron chlorides, present in a significant quantity, when ores 11 such as clays are used, which provide difficulty in producing sufficiently pure aluminum chloride for further processing into the metal, for instance by way of electrolysis.

The off gases 14 from the reactor 10 are conveyed to a condenser 15 operated at a temperature in the range of about 360° K., although higher tempertures in the neighborhood of 400° K. may be required. It is the purpose in the condenser 15 selectively to condense the aluminum and iron chlorides, leaving as off gases 16 the silicon tetrachloride, the titanium tetrachloride as well as the oxides of carbon, these being both carbon monoxide and carbon dioxide. Although pure titanium tetrachloride at one atmosphere pressure has a boiling point of 136.5° C. or approximately 410° K., the partial pressure of the titanium tetrachloride present in the condenser 15 is sufficiently small that the boiling point of the titanium tetrachloride in the condenser is lowered. For this reason, the condenser 15 may be operated at temperatures in the order of 360° K. while still performing the selective condensation of the aluminum and iron chlorides. It should be understood that if the partial pressure of titanium tetrachloride in the off gases 14 from the reactor 10 significantly increases such that the boiling point of the titanium tetrachloride in the condenser 15 approaches the 410° K. boiling point, then the condenser will have to be operated at a higher temperature.

The important distinction is that the temperature in the condenser 15 should be above the boiling point of the titanium tetrachloride in the gas mixture in the condenser and below the boiling point of the aluminum trichloride or hexachloride in the mixture. The boiling points are the same for the trichloride and hexachloride or double trichloride, of 453° K. at one atmosphere and pure aluminum trichloride. The foregoing discussion relative to partial pressures and the effect thereof on the boiling points of the constituents in the condenser 15 determines the operating temperature of the condenser which should be above the boiling point of the titanium tetrachloride and below the boiling point of the aluminum trichloride in order to effect the selective condensation of the aluminum chlorides and iron chlorides. It should be noted that the ferric trichloride and the double ferric trichloride (or the hexachloride) have a boiling point of approximately 592° K. while the ferrous chloride and double ferrous chloride have a melting point of 947° K., the ferrous chloride subliming from the solid to the gas phase. The only other significant chloride present is the silicon tetrachloride which has a boiling point of 330° K.

The mixture 17 of solid and liquid aluminum chlorides and iron chlorides leaving the condenser 15 is transported to a reactor 20 in which there is present aluminum sulfide 21. The aluminum sulfide 21 may be present either in the particulate form in a fluidized bed or it may be present as a solute in a molten salt bath. The molten salt preferably may be an alkali metal halide such as sodium chloride, potassium chloride or mixtures thereof, particularly the eutectic mixture. Whatever the form of the aluminum sulfide 21 in the reactor 20, the reactor 20 is maintained at a temperture greater than the boiling point of the ferric chloride or the double ferric chloride in order to ensure that the ferric chloride is in the vapor phase. As before stated, the boiling point of pure ferric chloride at one atmosphere pressure is 592° K. Depending on the makeup of the gaseous mixture in the reactor 20, it may be possible to operate the reactor 20 at a significantly lower temperature than 600° K. Nevertheless, it is important that the ferric trichloride or the double ferric trichloride be in the vapor phase. In any event, contact of gaseous ferric chloride and ferrous chloride along with gaseous aluminum trichloride or the double aluminum trichloride with solid or dissolved aluminum sulfide results in the conversion of iron chlorides to iron sulfides 23 including e.g. FeS and FeS$_2$ which precipitate, leaving the aluminum trichloride and the double aluminum trichloride 22 in the gas phase to exit from the reactor 20, thereby effecting the separation of the aluminum chlorides from the iron chlorides. Preferably, the aluminum sulfide 21 is present in excess of the stoichiometric quantity.

The precipitated iron sulfide 23 is passed to a separator 25, the feed stream 23 containing both unreacted aluminum sulfide as well as the precipitated iron sulfide. In the separator 25, the aluminum sulfide 27 is separated and conducted to a reactor 30 while the solid iron sulfide 26 is removed from the separator 25 and processed to recover the sulfur. In the reactor 30, the feed 31 is comprised of aluminum oxide and carbon disulfide reacted to produce the aluminum sulfide, the energy requirement of producing aluminum sulfide from aluminum oxide being significantly less than to produce aluminum metal. It is for this reason that aluminum sulfide is preferred as a scavenger for the iron rather than using aluminum metal. In this manner, it is seen that the expensive chlorine reagent is recovered entirely from the major contaminant, iron.

For instance, a composition of 67.6% by weight aluminum trichloride and double aluminum trichloride and 16.5% by weight of iron chlorides and 13.0% by weight silicon tetrachloride and 2.9% by weight titanium tetrachloride reacted with aluminum sulfide at 800° K. will result in a mixture containing 88.55% by weight aluminum trichloride and double aluminum trichloride; 0.0047% by weight iron or ferric chloride; 8.2% by weight silicon tetrachloride; and 3.24% by weight titanium tetrachloride. Reducing the temperature of this gaseous mixture to about 400° K. results in the selective condensation of the aluminum chlorides and the iron chlorides resulting in a condensate composition of aluminum trichloride and double trichloride of 99.99% by weight and only 0.005% by weight ferric chloride, the remainder being impurities of silicon, titanium and carbon. As can be seen, this is an extremely pure aluminum chloride material which is entirely satisfactory for further processing to aluminum metal having acceptable iron impurities.

On the other hand, starting with the calculated compositions of the off gases 14 from the carbo-chlorination of bauxite in the reactor 10, using the well-known high carbon reaction, there would be present in the off gases 14, 67.6% by weight aluminum chlorides; 5.4% by weight ferrous chloride; 11.1% by weight ferric chlorides; 13.0% by weight silicon tetrachloride; and 2.9% by weight titanium tetrachloride. If the temperatures of these off gases is reduced to 800° K., ferrous chloride condenses to the solid leaving in the gas phase 67.89% by weight aluminum chlorides; 12.55% by weight ferric chlorides; 14.01% by weight silicon tetrachloride; and 5.55% by weight titanium tetrachloride. Further temperature reduction of this gaseous mixture to 600° K. theoretically results in further condensation of ferric chloride; however, it has been illustrated in the literature that what occurs is an iron-aluminum complex of iron aluminum hexachloride which has the same volatility as aluminum trichloride and, therefore, is extremely difficult to separate from the aluminum trichloride.

Even if the theoretical thermodynamic calculations were accurate and the process were to follow the thermodynamic predictions as previously indicated, the condensate left after the final selective condensation at 400° K. would result in a mixture of 99.77% by weight aluminum chlorides and 0.23% by weight iron chlorides. The off gas from the final selective condensation contains 0.02% by weight aluminum trichlorides as well as the entire amount of silicon tetrachloride and titanium tetrachloride. Even if this were to happen, which it does not, the process would be unsatisfactory because the 0.23% by weight iron chloride in the final aluminum chloride product is too high for successful conversion to aluminum metal, and the 0.02% by weight aluminum trichloride lost in the off gas from the final selective condensation is too high resulting in an intolerable loss of aluminum to a non-recoverable off gas.

As before stated, the problem with the separation by condensation is not only that it does not work as the theoretical thermodynamic calculations indicate, but also significant quantities of expensive chlorine reagent are lost or at least require further recovery steps. In addition, the final product is contaminated to an excessive extent by ferric chloride and also excessive amounts of aluminum chlorides are lost with the off gas. In contradistinction, the aluminum sulfide system of the present invention produces an extremely pure aluminum trichloride while at the same time conserving a substantial amount of the chlorine reagent for later reuse. By using aluminum sulfide as the sulfidizing agent, the reaction with the iron chlorides produces additional quantities of aluminum chloride, the sought product. This is a great advantage, not only because aluminum sulfide is less expensive to make than aluminum metal, but the very product to be collected is produced by the reaction used to separate the iron chlorides from the aluminum chlorides, this being a significant advantage over the processes that introduce different reagents which possibly contaminate the final off product aluminum trichloride gas. Below in Table I are set forth data showing the difference in separation of aluminum chlorides and iron chlorides according to the method of the present invention with temperatures varied incrementally from 1400° K. to 800° K., for a stoichiometric amount of aluminum sulfide. The table is generated pursuant to a NASA computer model entitled "NASA Code for Thermodynamic Equilibrium Composition Calculation".

TABLE I

| CHEMICAL FORMULA OF REACTANT | | | | MOLES | |
|---|---|---|---|---|---|
| Al$_2$S$_3$ | | | | .25 | |
| FeCl$_2$ | | | | .1677 | |
| FeCl$_3$ | | | | .2706 | |
| AlCl$_3$ | | | | 1.9826 | |
| Al$_2$Cl$_6$ | | | | .0087 | |
| Fe$_2$Cl$_6$ | | | | .0039 | |
| RUN | 1 | 2 | 3 | 4 | 5 |
| P, ATM | 1.0 | 1.0 | 1.0 | 1.0 | 1.0 |
| T, K | 1400 | 1200 | 1000 | 900 | 800 |
| CHEMICAL FORMULA OF PRODUCTS | | | MOLES | | |
| AlCl$_3$ | 2.491 | 2.453 | 2.131 | 1.471 | 0.6789 |
| Al$_2$Cl$_6$ | 0.0045 | 0.0233 | 0.1841 | 0.4871 | 0.9105 |
| FeCl$_2$ | 0.2546 | 0.0679 | 0.0067 | 0.00014 | 0.00015 |
| FeCl$_3$ | 0.0009 | 0.00051 | 0.00016 | 0.00003 | 0.00003 |
| Fe$_2$Cl$_6$ | 0.0019 | 0.0011 | 0.0002 | 0.00007 | 0.00001 |
| FeS | 0.1868 | 0.3754 | 0.4388 | 0.300 | 0.2974 |
| FeS$_2$ | — | — | — | 0.1444 | 0.1486 |

An examination of the data shows that the lower 800° K. temperature is preferred and it is anticipated that greater than stoichiometric quantities of aluminum sulfide, will have the beneficial effect of reducing the amount of iron chlorides in the off gas product.

As may be seen there has been provided a method of separating iron and aluminum chlorides particularly useful in the production of aluminum trichloride gas sufficiently pure to be feed material for the production of aluminum metal. Purities in the order of 99.99% aluminum trichloride are possible with this method which is designed to converse, to the extent possible, the expensive chlorine reagent. Specifically, the most significant contaminant present after the carbo-chlorination of aluminous ores is iron present in both the ferric and ferrous states as the chloride, but the separation is designed to recover essentially all the chlorine combined with the iron. The advantage of this process is economic in the sense of conserving expensive reagent while at the same time, by using aluminum sulfide, excess quantities of the product to be collected, that is aluminum trichloride, are produced without introducing unwanted contaminants into the system. Aluminum sulfide is the preferred reagent for effecting the precipitation of iron from a gaseous mixture of iron chlorides and aluminum chlorides since it is the least expensive reagent available which at the same time does not introduce unwanted contaminants into the final aluminum trichloride product. Particularly, aluminum sulfide is less expensive to use than aluminum metal and is therefore preferred.

While there has been presented what at present is considered to be the preferred embodiment of the present invention it will be understood that various modifications and alterations may be made to the inventive process without departing from the true spirit and scope thereof and it is intended to cover within the claims appended hereto all such modifications and alterations.

The embodiments of the invention in which an exclusive property or privilege is claimed are defined as follows:

1. A method of producing aluminum chloride from aluminous materials containing iron comprising reacting said aluminous materials containing iron with carbon and a chlorine-containing gas at a temperature sufficient to form a gaseous mixture including chlorides of aluminum and iron and oxides of carbon, contacting the chlorides of aluminum and iron with aluminum sulfide at a temperature sufficient to precipitate iron sulfide and to form gaseous aluminum chloride, and separating aluminun chloride gas from the precipitated iron sulfide.

2. The method of producing aluminum chloride set forth in claim 1, wherein the aluminous materials are reacted with carbon and the chlorine-containing gas at a temperature in the range of between about 900° K. and about 1200° K.

3. The method of producing aluminum chloride set forth in claim 1, wherein the reaction with aluminum sulfide takes place in the temperature range of between about 600° K. and about 1100° K.

4. The method of producing aluminum chloride set forth in claim 1, wherein the aluminum sulfide is present in an amount in excess of the stoichiometric quantity and the reaction takes place at a temperature of about 800° K.

5. The method of producing aluminum chloride set forth in claim 4, wherein the aluminum sulfide is in the form of a bed of particles at least partially fluidized by passage therethrough of the gaseous chlorides of aluminum and iron.

6. The method of producing aluminum chloride set forth in claim 1, wherein the aluminum sulfide is present as a solute in a molten salt bath.

7. The method of producing aluminum chloride set forth in claim 6, wherein said molten salt has an alkali metal cation.

8. The method of producing aluminum chloride set forth in claim 6, wherein the molten salt is sodium chloride, potassium chloride or mixtures thereof.

9. The method of producing aluminum chloride set forth in claim 6, wherein the molten salt is the eutectic of sodium chloride and potassium chloride.

10. A method of producing aluminum chloride from aluminous materials containing minor amounts of compounds of iron, titanium and silicon comprising reacting said aluminous materials with carbon and a chlorine-containing gas in the temperature range of from about 900° K. to about 1200° K. to form a gaseous mixture containing chlorides of aluminum, iron, titanium and silicon and oxides of carbon, cooling said gaseous mixture to a temperature in the range below the boiling point of the aluminum chloride in the mixture and above the boiling point of the titanium chloride in the mixture to condense the aluminum chlorides and iron chlorides while titanium chloride and silicon chloride remain in the gas phase to effect a separation thereof; heating the mixture of iron chlorides and aluminum chlorides to a temperature in excess of the boiling point of the iron chlorides in the mixture to form gaseous aluminum chlorides and iron chlorides; passing the heated gases into intimate contact with aluminum sulfide to precipitate iron sulfide and to form gaseous aluminum chloride; and separating gaseous aluminum chloride from the precipitated iron sulfide.

11. The method of producing aluminum chloride set forth in claim 10, wherein the gaseous titanium chloride silicon chloride are separated from the aluminum chlorides and the iron chlorides by cooling the mixture to a temperature below 400° K.

12. The method of producing aluminum chloride set forth in claim 10, wherein the reaction of iron chlorides and aluminum sulfide takes place in the temperature range of between about 600° K. and about 1100° K.

13. The method of producing aluminum chloride set forth in claim 10, wherein the reaction of iron chlorides with aluminum sulfide takes place at a temperature of about 800° K. and the aluminum sulfide is present in an amount greater than the stoichiometric quantity.

14. The method of producing aluminum chloride set forth in claim 10, and further comprising separating the precipitated iron sulfide from the unreacted aluminum sulfide and recycling the aluminum sulfide for contact with the heated mixture of iron chlorides and aluminum chlorides.

15. The method of producing aluminum chloride set forth in claim 10, wherein the method is continuous and aluminum sulfide is continuously produced by the reaction of aluminum oxide and carbon disulfide.

16. A method of separating gaseous mixtures of iron chlorides and aluminum chlorides comprising contacting said gaseous mixtures with aluminum sulfide at a temperature sufficient to precipitate iron sulfide and to form gaseous aluminum chlorides, and separating said gaseous aluminum chlorides from said precipitated iron sulfide.

17. The method of separating gaseous mixtures of iron chlorides and aluminum chlorides set forth in claim 16, wherein the temperature is greater than the boiling point of the iron chlorides in the gaseous mixture.

18. The method of separating gaseous mixtures of iron chloride and aluminum chloride set forth in claim 16, wherein the aluminum sulfide is in the form of solid particles.

19. The method of separating gaseous mixtures of iron chloride and aluminum chloride set forth in claim 18, wherein the aluminum sulfide is in a fluidized bed at least partially fluidized by the passage therethrough of the gaseous mixtures of aluminum chlorides and iron chlorides.

20. The method of separating gaseous mixtures of iron chlorides and aluminum chlorides set forth in claim 16, wherein aluminum sulfide is present in a molten salt bath.

21. The method of separating gaseous mixtures of iron chlorides and aluminum chlorides set forth in claim 16, wherein the aluminum sulfide is present as a solute in an alkali metal chloride bath.

22. The method of separating gaseous mixture of iron chlorides and aluminum chlorides set forth in claim 21, wherein said alkali metal chloride bath is a eutectic mixture of sodium chloride and potassium chloride.

23. The method of separating gaseous mixture of iron chlorides and aluminum chlorides set forth in claim 16, wherein the aluminum sulfide is present in an amount greater than the stoichiometric quantity and the temperature is in the range of from about 600° K. to about 1100° K.

* * * * *